United States Patent
Kumar et al.

(10) Patent No.: US 7,577,157 B2
(45) Date of Patent: Aug. 18, 2009

(54) FACILITATING TRANSMISSION OF A PACKET IN ACCORDANCE WITH A NUMBER OF TRANSMIT BUFFERS TO BE ASSOCIATED WITH THE PACKET

(75) Inventors: Alok Kumar, Santa Clara, CA (US); Prashant Chandra, Sunnyvale, CA (US); Uday Naik, Fremont, CA (US); Ameya S. Varde, Santa Clara, CA (US); David Chou, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 980 days.

(21) Appl. No.: 10/734,406

(22) Filed: Dec. 12, 2003

(65) Prior Publication Data

US 2005/0132078 A1    Jun. 16, 2005

(51) Int. Cl.
*H04L 12/28* (2006.01)
*H04L 12/56* (2006.01)

(52) U.S. Cl. .................. 370/412; 370/428; 370/229

(58) Field of Classification Search ......... 370/229–252, 370/322–292, 393–492, 389, 392, 352, 353; 709/230–249
See application file for complete search history.

(56) References Cited

U.S. PATENT DOCUMENTS

| | | | |
|---|---|---|---|
| 5,734,654 A * | 3/1998 | Shirai et al. ............. 370/396 |
| 6,418,474 B1 * | 7/2002 | Morris ..................... 709/233 |
| 6,594,270 B1 * | 7/2003 | Drummond-Murray et al. .................... 370/412 |
| 6,732,116 B2 * | 5/2004 | Banerjee et al. ........... 707/102 |
| 6,788,687 B2 * | 9/2004 | Bao et al. ................. 370/394 |
| 6,851,008 B2 * | 2/2005 | Hao ......................... 710/305 |
| 7,092,977 B2 * | 8/2006 | Leung et al. ............... 707/205 |
| 7,111,119 B2 * | 9/2006 | Minowa .................... 711/114 |
| 7,236,491 B2 * | 6/2007 | Tsao et al. ................ 370/392 |
| 7,248,593 B2 * | 7/2007 | Minnick et al. ............ 370/412 |
| 7,286,549 B2 * | 10/2007 | Gaur ....................... 370/412 |
| 7,454,446 B2 * | 11/2008 | Leung et al. ............... 707/205 |
| 2002/0146014 A1 * | 10/2002 | Karlsson et al. .......... 370/395.6 |
| 2003/0026205 A1 * | 2/2003 | Mullendore et al. ....... 370/230 |
| 2003/0204653 A1 * | 10/2003 | Katayama ................. 710/52 |
| 2004/0213235 A1 * | 10/2004 | Marshall et al. .......... 370/392 |
| 2004/0260832 A1 * | 12/2004 | Kota et al. ................ 709/234 |
| 2005/0063376 A1 * | 3/2005 | Subramanian ............. 370/389 |
| 2005/0128945 A1 * | 6/2005 | Kuo et al. ................. 370/230 |

* cited by examiner

*Primary Examiner*—Edan Orgad
*Assistant Examiner*—Chuong T Ho
(74) *Attorney, Agent, or Firm*—Buckley, Maschoff & Talwalkar LLC

(57) ABSTRACT

According to some embodiments, a processing element arranges for a packet to be transmitted through a port without storing a packet identifier in a local transmit queue if a number of transmit buffers to be associated with the packet does not exceed a pre-determined threshold.

16 Claims, 10 Drawing Sheets

FACILITATING TRANSMISSION OF A PACKET IN ACCORDANCE WITH A NUMBER OF TRANSMIT BUFFERS TO BE ASSOCIATED WITH THE PACKET

BACKGROUND

A network device may facilitate an exchange of information packets through a number of different output paths or "ports." For example, a network processor may receive packets of information, process the packets, and arrange for packets to be transmitted through an appropriate port. Moreover, it may be helpful to avoid unnecessary delays when processing the packets—especially when the network device is associated with a relatively high speed network.

DETAILED DESCRIPTION

Figure 1:
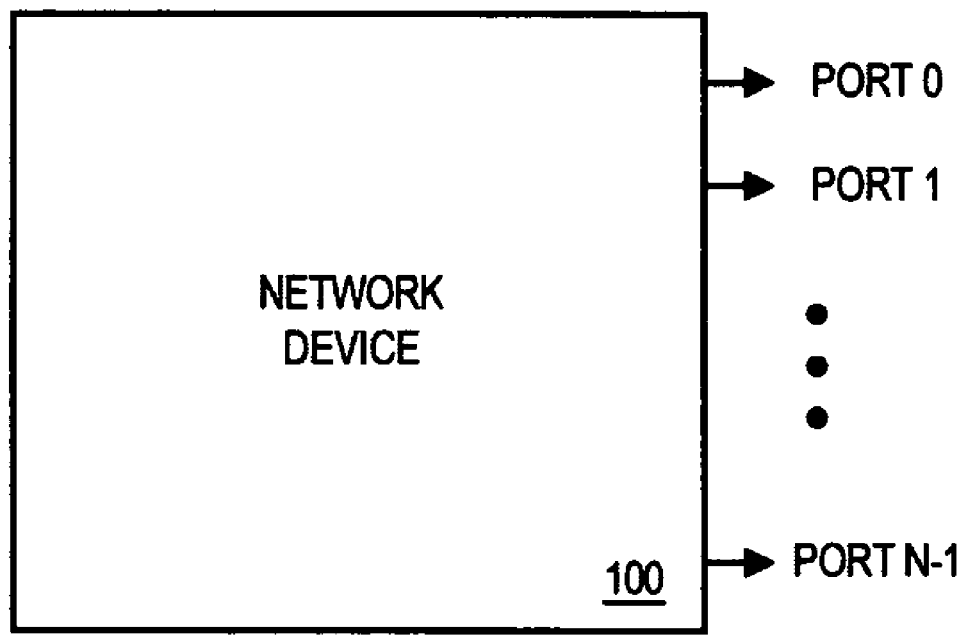
FIG. 1 is a block diagram of network device.

A network device may facilitate an exchange of information packets through a number of different ports. For example, as illustrated in FIG. 1 a network device 100 might transmit packets of information through N ports. As used herein, the phrase "network device" might refer to, for example, an apparatus that facilitates an exchange of information via a network, such as a Local Area Network (LAN), or a Wide Area Network (WAN). Moreover, a network device might facilitate an exchange of information packets in accordance with the Fast Ethernet LAN transmission standard 802.3-2002® published by the Institute of Electrical and Electronics Engineers (IEEE). Similarly, a network device may process and/or exchange Asynchronous Transfer Mode (ATM) information in accordance with ATM Forum Technical Committee document number AF-TM-0121.000 entitled "Traffic Management Specification Version 4.1" (March 1999). According to some embodiments, the network device processes and/or exchanges Synchronous Optical Network (SONET) information via an Optical Carrier level (OC) 48 or OC-192 network as specified in "Digital Hierarchy—Optical Interface Rates and Formats Specification, American National Standards Institute (ANSI) document T1.105 (1991).

The network device 100 may be associated with, for example, a network processor, a switch, a router (e.g., an edge router), a layer 3 forwarder, and/or protocol conversion. Examples of network devices include those in the INTEL® IXP 2400 family of network processors.

Figure 2:
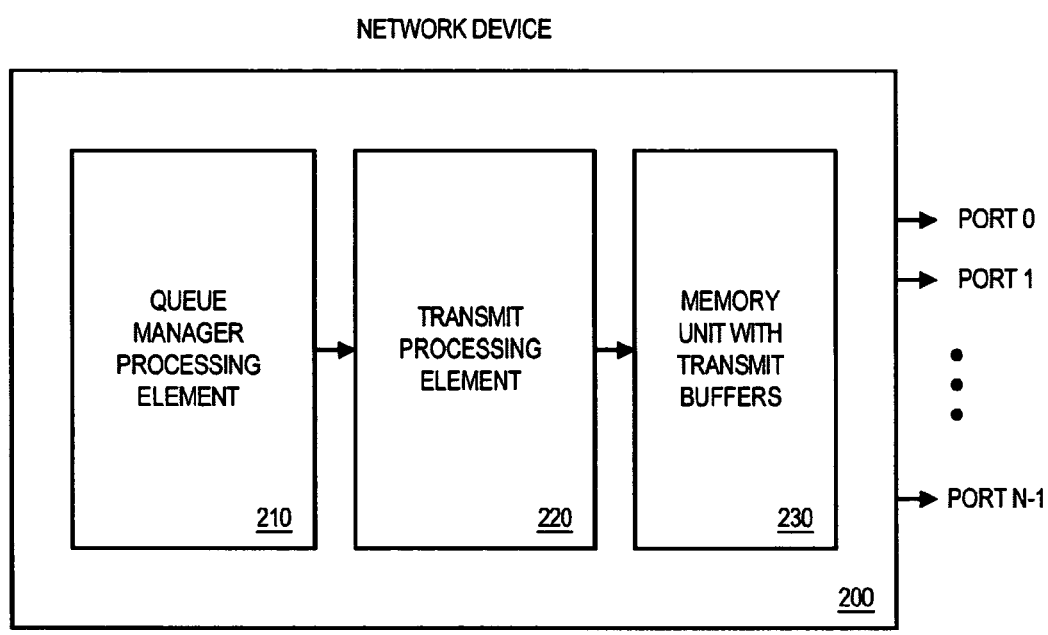
FIG. 2 is a block diagram of network device having a number of processing elements.

The network device 100 may receive packets of information, process the packets, and arrange for packets to be transmitted through an appropriate port. FIG. 2 is a block diagram of network device 200 that has a number of processing elements. In particular, a queue manager processing element 210 may select a packet to be transmitted through a port and provide a request to transmit the packet to a transmit processing element 220. The packets might be selected, for example, based on quality of service parameters associated with each packet. The queue manager processing element 210 and the transmit processing element 220 may comprise, for example, multi-threaded, Reduced Instruction Set Computer (RISC) devices or "microengines."

The transmit processing element 220 may then process the request and arrange for a packet to be transmitted through an appropriate port using an external memory unit 230 (e.g., external to the transmit processing element 220). For example, the transmit processing element 220 may arrange for packets to be transmitted using fixed-size transmit buffers (e.g., 64-byte or 128-byte buffers) in the external memory unit 230. Packets stored in the transmit buffers can then be removed and transmitted out of the network device 200 (e.g., by a hardware unit).

Figure 3:
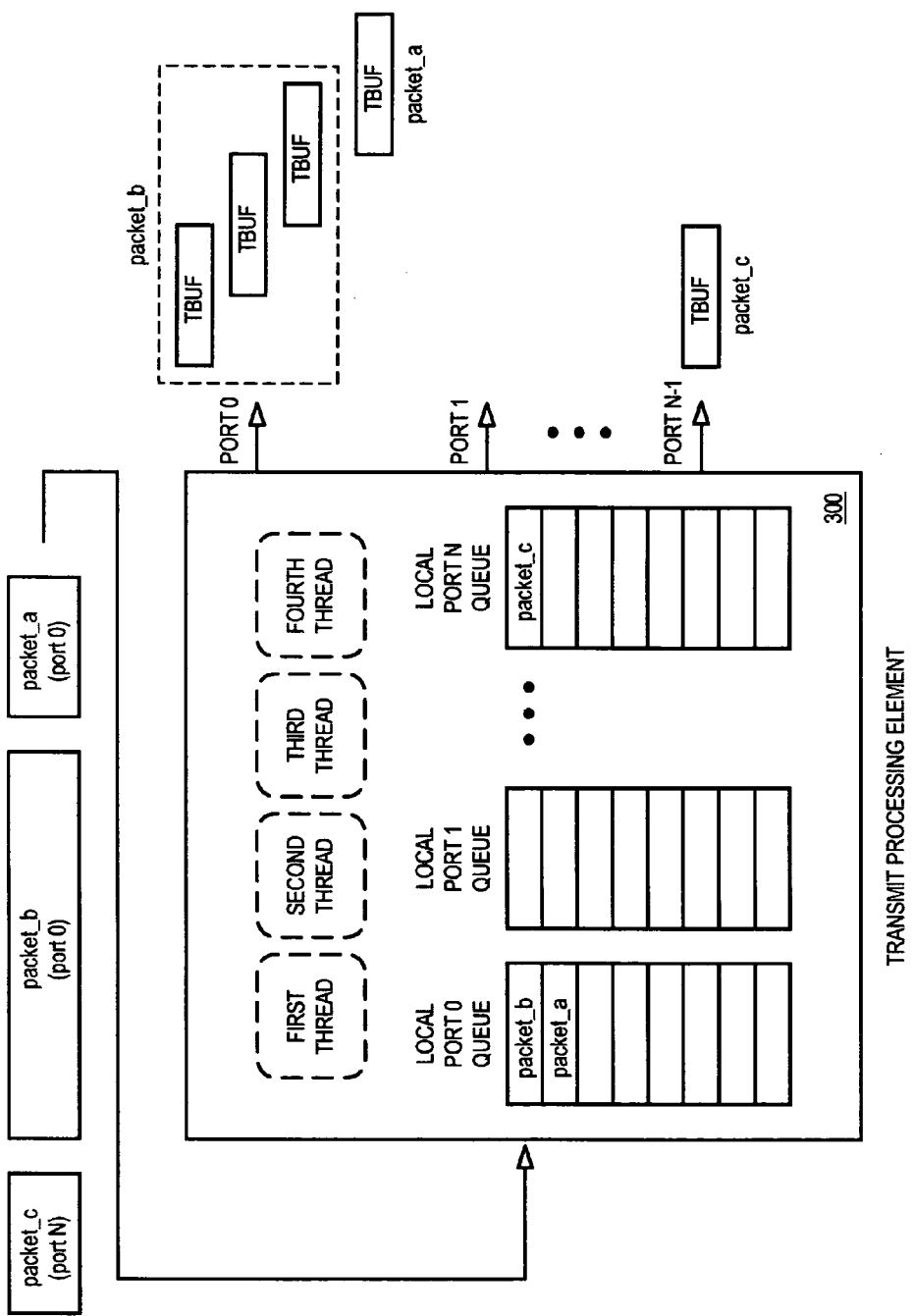
FIG. 3 is a block diagram of a transmit processing element.

FIG. 3 is a block diagram of a transmit processing element 300. In this case, the transmit processing element 300 received requests to transmit three packets: "a" through "c." The request might, for example, be received from a queue manager processing element and include a packet identifier (e.g., a pointer associated with the packet).

Note that different packets may be associated with different ports. For example, the transmit processing element 300 might use the packet identifier associated with packet_a to determine that packet_a should be transmitted through port 0. Likewise, the transmit processing element 300 might use the packet identifier associated with packet_b to determine that packet_b should also be transmitted through port 0 and the packet identifier associated with packet_c to determine that packet_c should be transmitted through port N−1.

Moreover, different packets may be of different sizes (e.g., bytes). For example, packet_a and packet_c might be "small" packets that can be transmitted using a single transmit buffer (TBUF) while packet_b is a "large" packet that needs to be transmitted using multiple transmit buffers. Note that when a request to transmit a packet is received, the transmit processing element 300 may not be aware of the port associated with the packet or of the size of the packet.

The transmit processing element 300 may be able to execute a number of different threads (e.g., associated with different thread contexts). Note that there may be a disparity in processor cycle times as compared to external memory times. As a result, a single thread of execution may become blocked while waiting for a memory operation to complete. Having multiple threads available may allow for threads to interleave operation (e.g., there may be at least one thread ready to run while others are blocked) and improve usage of the processing element resources. Although four threads are illustrated in FIG. 3, the transmit processing element might be able to execute any other number of different threads.

When requests to transmit a series of small packets are being processed, each thread might be able to arrange for a different packet to be transmitted (e.g., a first thread might arrange for a first packet to be transmitted and a second thread might then arrange for a second packet to be transmitted). A request to transmit a large packet, however, may need to be processed by multiple threads (e.g., a first thread might arrange for a first portion of the packet to be transmitted and a second thread might then arrange for a second portion of the same packet to be transmitted).

To determine which packet should be processed, a thread could access packet information stored in external memory, such as in a Static Random Access Memory (SRAM) unit. Accessing external memory however, can take a significant number of cycles to perform and may reduce the performance of the transmit processing element 300.

In another approach, every time a request to transmit a packet is received by the transmit processing element 300, information associated with that packet can be "locally" stored in a transmit queue associated with the appropriate port. For example, every time a request is received the packet identifier may be stored in a local memory queue, and the identifiers may be dequeued one-by-one as necessary. Even in this case, however, the amount of overhead associated with the process can be significant (e.g., it might take five clock cycles to store the information in the local transmit queue).

To improve performance, in some embodiments it may be arranged for a packet to be transmitted through a port without storing the packet identifier in the local transmit queue when a number of transmit buffers to be associated with the packet does not exceed a pre-determined threshold. For example, the transmit processing element 300 might avoid storing the packet identifier in the local transmit queue if the packet can be transmitted by a single thread.

Figure 4:
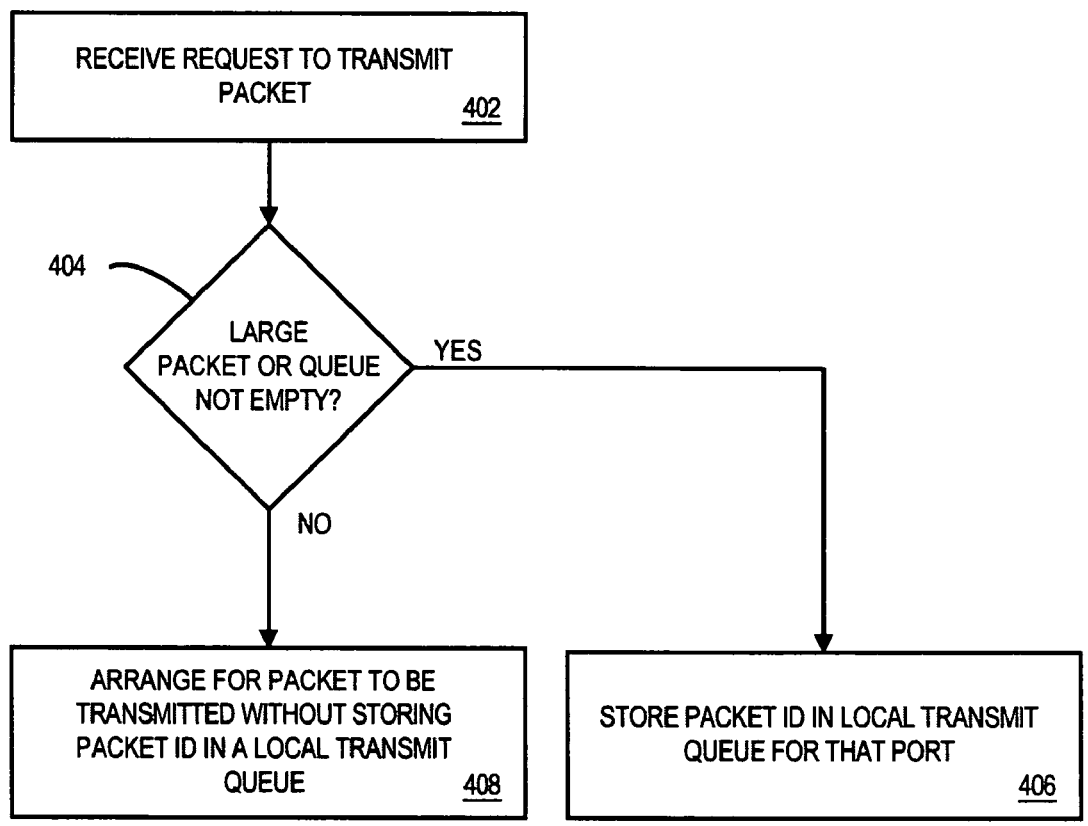
FIG. 4 is a flow chart of a method according to some embodiments.

FIG. 4 is a flow chart of a method the might be performed by the transmit processing element 300 according to some embodiments. The flow charts described herein do not necessarily imply a fixed order to the actions, and embodiments may be performed in any order that is practicable. Note that any of the methods described herein may be performed by hardware, software (including microcode), or a combination of hardware and software. For example, a storage medium may store thereon instructions that when executed by a machine result in performance according to any of the embodiments described herein.

At 402, a request to transmit a packet is received. For example, the transmit processing element 300 might receive from a queue manager a request including a packet identifier (e.g., a pointer). Note that a thread might evaluate the status of local transmit queues before checking to see if a request has been received (e.g., if there is already another packet pending for an available port, the thread might process that packet instead of receiving the new request).

If it is determined at 404 that the request is associated with a large packet (e.g., if the packet needs more than a pre-determined threshold number of transmit buffers to be transmitted) or that the associated local transmit queue is not empty (e.g., if there is already another packet pending to be transmitted through that port), the packet identifier is stored in the local transmit queue for the appropriate port at 406. According to some embodiments, the packet identifier is instead stored in an external memory unit when the local transmit queue is completely full. Note that because the packet it large, there may be sufficient extra cycles to store and read the packet information from the local memory.

In the case where the local transmit queue was not empty, a packet identifier that was previously stored in the queue may be processed. That may be done, for example, to ensure the appropriate ordering of packets (e.g., packets associated with a particular port should leave in the same order they arrived).

If the request is not associated with a large packet and the local transmit queue is empty, it is arranged for the packet to be transmitted without storing the packet identifier in the local transmit queue at 408.

Figure 5:
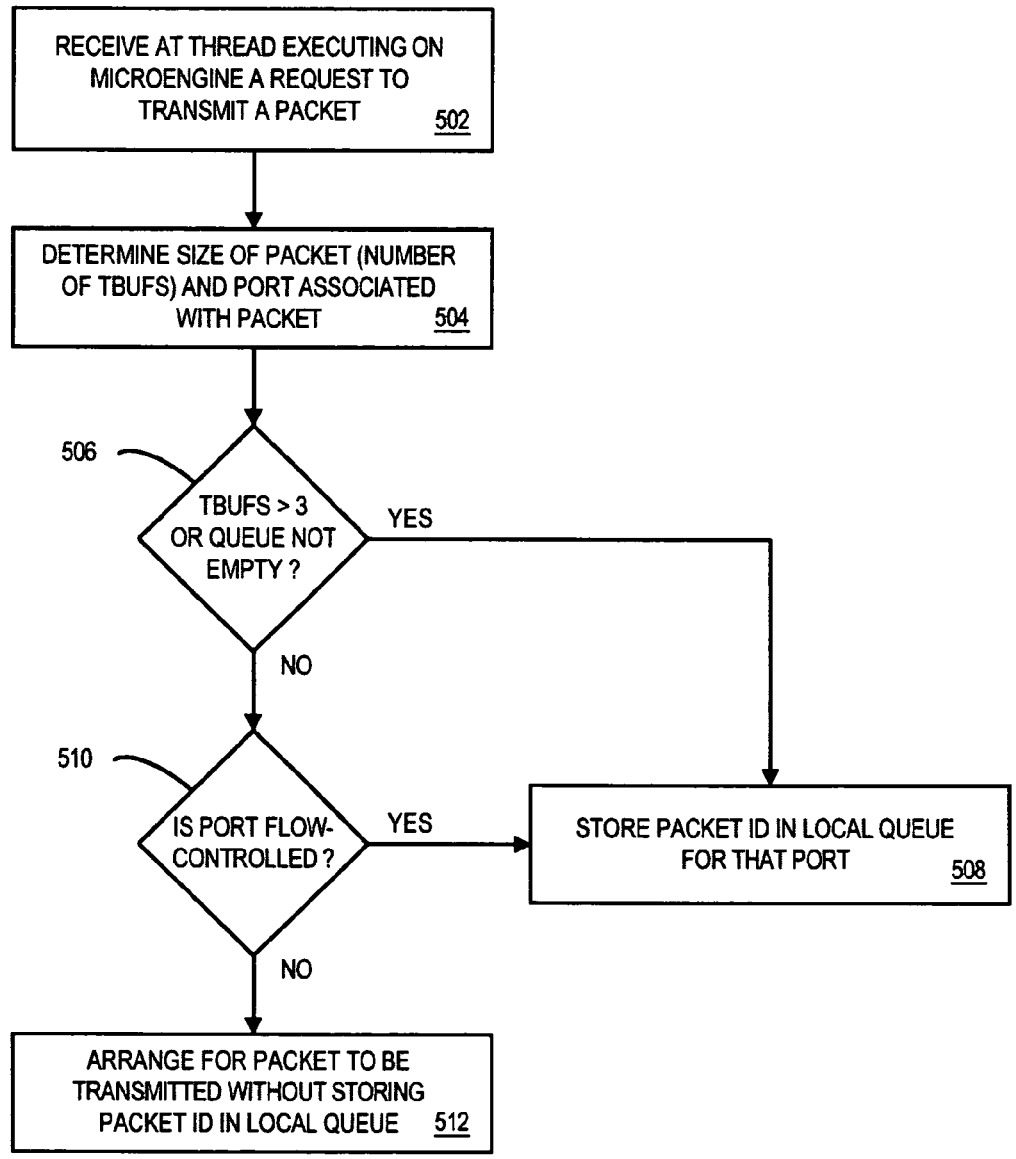
FIG. 5 is a flow chart illustrating an example of a method according to one embodiment.

The threshold value that is used to determine whether or not a packet can be transmitted without storing the packet identifier in the local transmit queue may depend on the performance parameters and requirements of the network device. FIG. 5 is a flow chart illustrating an example of a method according to one embodiment.

At 502, a thread executing on a microengine receives a request to transmit a packet. The size of the packet (e.g., the number of transmit buffers or TBUF elements that will be needed to transmit the packet) is then determined at 504 along with the port associated with the packet.

If more than three TBUF elements will be needed to transmit the packet at 506, the packet identifier is stored in the local queue for that port (e.g., because multiple threads will need to process a packet of that size). Similarly, if the local transmit queue is not empty, the packet identifier is also stored in the queue (e.g., and a previously existing packet identifier may be processed to ensure the appropriate ordering of packets for that port).

Note that a packet requiring more than three TBUF elements may use significantly less memory cycles than would otherwise be budgeted and, therefore, there may be sufficient cycles to store the packets by other threads in that round. Consider, for example, the case where the size of a single TBUF element is 128 bytes. When a 129 byte packet is to be transmitted, two TBUF elements need to be used. However, the budget for that packet is not double what would be required for a 128 packet. Therefore, according to some embodiments packets as large as three TBUF elements may be processed immediately by a thread. If the packet does not fit into three TBUF elements, the packet identifier is placed into the local transmit queue. In this case, there may be sufficient cycles available (e.g., there may be sufficient budget to pass the state of a packet from one thread to another). The threshold value of three TBUF elements is only provided as an example, and the appropriate value might depend on various performance parameters and requirements of the network device.

Also note that the rate at which packets should be transmitted through a particular interface might be limited. For example, a downstream device might only be able to receive packets at a limited rate. As a result, the flow of packets through a particular port may be controlled. If it is determined that the port through which the packet will be transmitted is flow-controlled at 510, the packet identifier is stored in the local transmit queue for that port (e.g., because the packet cannot be transmitted through the port at this time).

If three (or fewer) TBUFs are needed to transmit the packet, the local transmit queue is empty, and the port is not flow-controlled, the thread arranges for that packet to be transmitted without storing the packet identifier in a local transmit queue. As a result, a port which can accept packets may not be penalized because of a another port that is flow-controlled.

Figure 6:
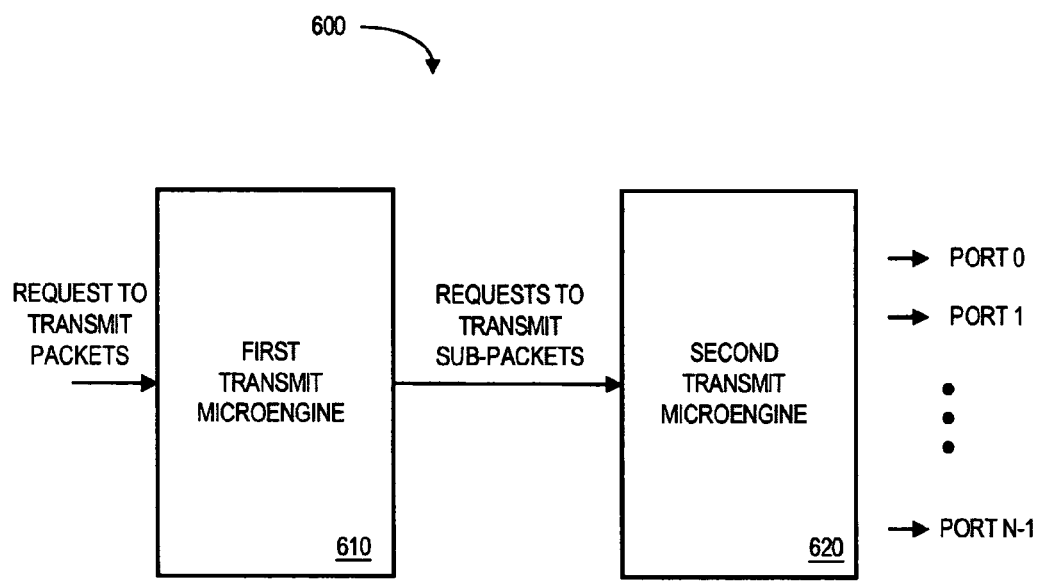
FIG. 6 is a block diagram illustrating multiple transmit processing elements according to another embodiment.

According to another embodiment, more than one microengine is used to create a transmit block. For example, FIG. 6 is a block diagram of a transmit block 600 that includes both a first transmit microengine 610 and a second transmit microengine 620 (e.g., multi-threaded processing elements). Note that creating a functional pipeline by executing transmit block code in two microengines might impose significant overhead because of inter-microengine signaling and the use of shared data structures in an external memory unit.

Figure 7:
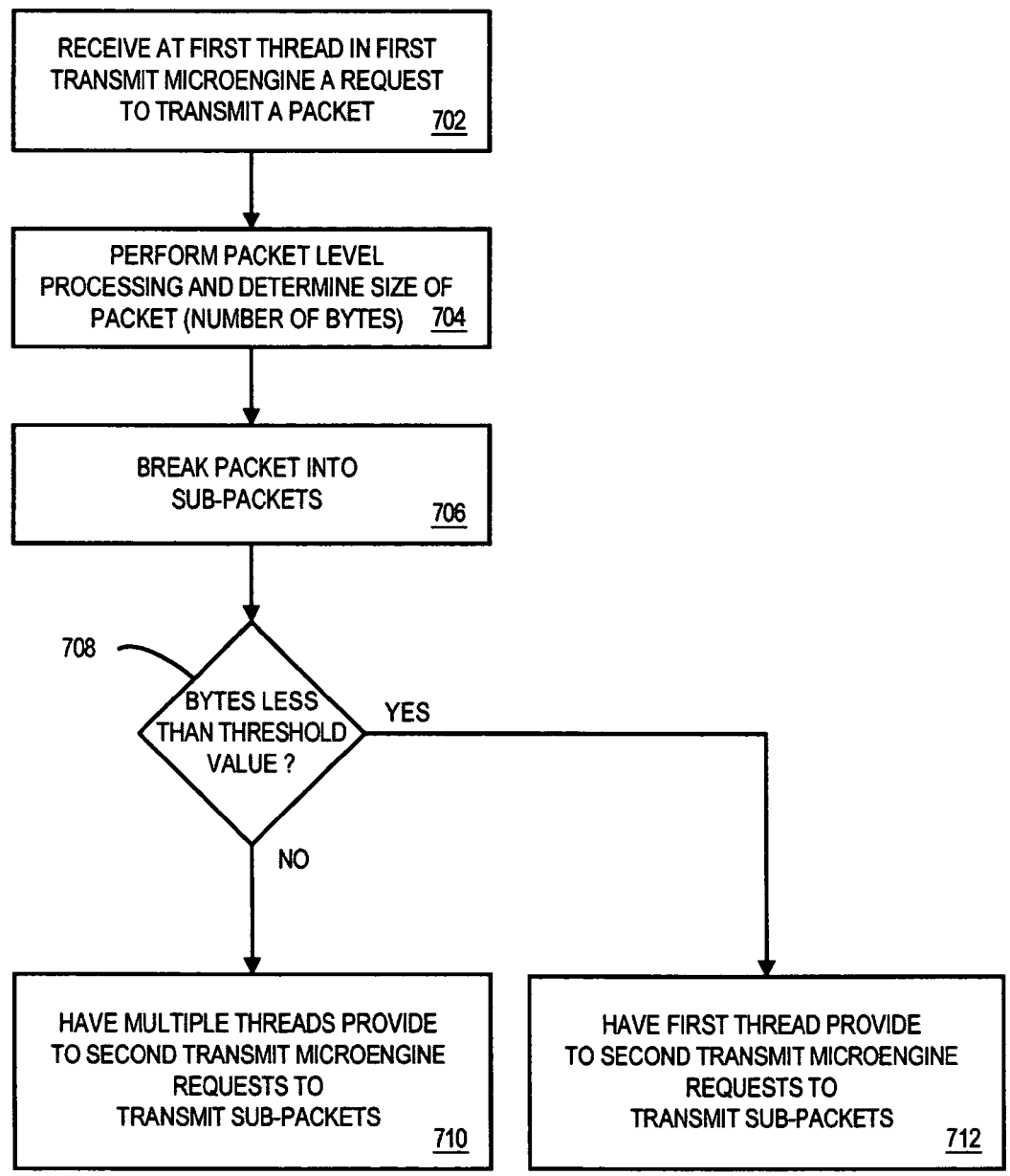
FIG. 7 is a flow chart of a method associated with a first transmit microengine according to some embodiments.
Figure 8:
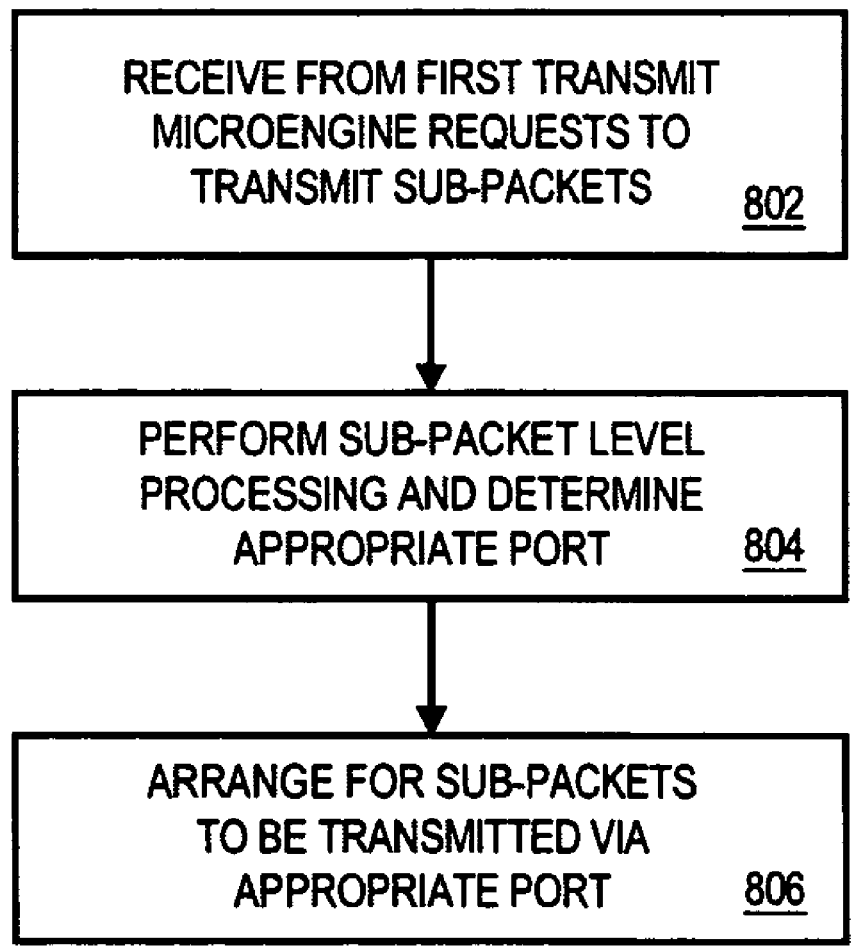
FIG. 8 is a flow chart of a method associated with a second transmit microengine according to some embodiments.

As described with respect to FIGS. 7 and 8, the first transmit microengine 610 may receive a request to transmit a packet (e.g., from a queue manager), perform packet-level processing, divide the packet into a number of sub-packets (with each sub-packet needing only a single transmit buffer to be transmitted), and provide a number of requests to transmit sub-packets to the second transmit microengine 620. The second transmit microengine 620 may then perform sub-packet level processing and arrange for the sub-packets to be transmitted via appropriate ports. Because the first transmit microengine 610 performs packet level processing while the second transmit microengine 620 performs sub-packet level processing, the amount of inter-microengine signaling and the use of shared data structures may be reduced.

FIG. 7 is a flow chart of a method associated with the first transmit microengine element 610 according to this embodiment. At 702, at first thread executing at the first transmit microengine 610 receives a request to transmit a packet. Packet-level processing is then performed and the size of the packet (e.g., the number of bytes in the packet) is determined at 704. The packet is broken into sub-packets at 706, each sub-packet being small enough to be transmitted using a single transmit buffer.

If the number of bytes associated with the packet is less than a threshold value at 708, the first thread provides to the second transmit microengine 620 one or more requests to transmit the sub-packets. If the number of bytes associated with the packet is not less than the threshold value at 708, multiple threads provide to the second transmit microengine 620 requests to transmit the sub-packets at 710. For example, if a TBUF element is 128 bytes, a single thread might process packets of 1 through 256 bytes while multiple threads would process packets of more than 256 bytes.

According to some embodiments, the first transmit microengine 610 sends the requests to transmit the sub-packets via a dedicated path that provides information from the first transmit microengine 610 to the second transmit microengine 620. For example, the first transmit microengine 610 might store the request in a "next neighbor" register at the second transmit microengine 620 as described with respect to FIG. 9.

FIG. 8 is a flow chart of a method associated with the second transmit microengine 620 according to this embodiment. Requests to transmit sub-packets are received from the first microengine at 802 (e.g., via a next neighbor register). At 804, the second transmit microengine 620 performs sub-packet level processing and determines the port through which the sub-packet should be transmitted. It can then be arranged for the packet to be transmitted through that port at 806 (e.g., by using a single transmit buffer for each sub-packet).

Figure 9:
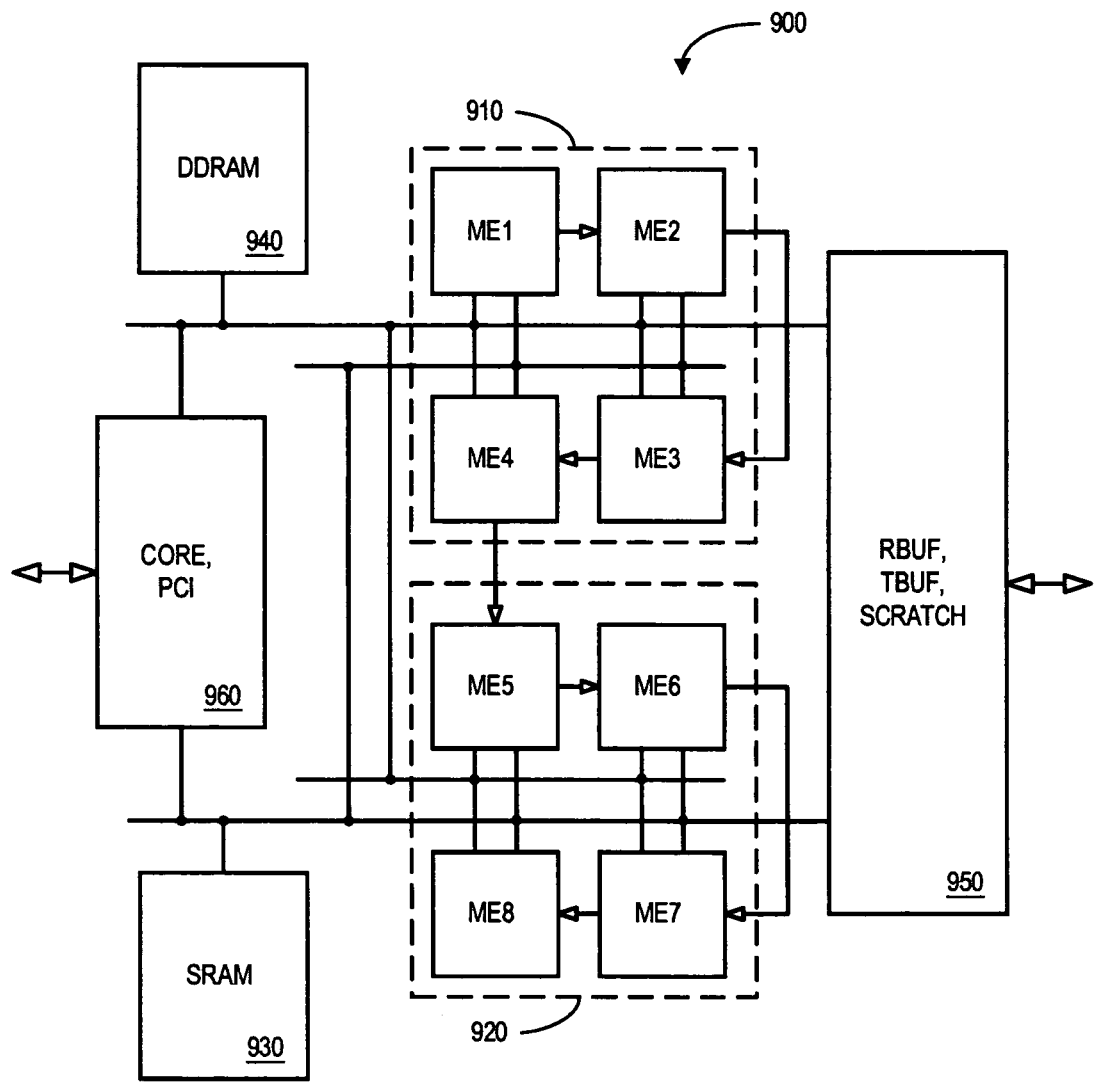
FIG. 9 illustrates a network processor according to some embodiments.

FIG. 9 illustrates a network processor 900 according to some embodiments. The network processor includes two clusters 910, 920, each having four microengines. One or more of the microengines may, for example, perform programmable per-packet processing in accordance with any of the embodiments described herein. According to some embodiments, microengine x (MEx) can transmit data to MEx+1 using a dedicated communication path (e.g., ME3 can send information directly to a next neighbor register in ME4). In some embodiments, a next neighbor register may be used as a source in an instruction (e.g., to supply operands to the execution data path).

Each microengine can exchange information with an SRAM unit 930 and a Double Data Random Access Memory (DDRAM) unit 940. The SRAM unit 930 may store, for example, packet identifiers that cannot be placed in a local memory queue at a microengine (e.g., because the local memory queue is full).

The network processor 900 may also include a core processor and/or a Peripheral Component Interconnect (PCI) unit 960 in accordance with the PCI Standards Industry Group (SIG) documents entitled "Conventional PCI 2.2" or "PCI Express 1.0." The core processor may comprise, for example, a general purpose 32-bit RISC processor that can be used to initialize and manage the network processor 900 (e.g., an INTEL® XSCALE™ core). In addition, the microengines may exchange information using receive buffers (RBUFs) to store information received by the network processor 900, TBUFs, and/or a scratch unit 950.

Figure 10:
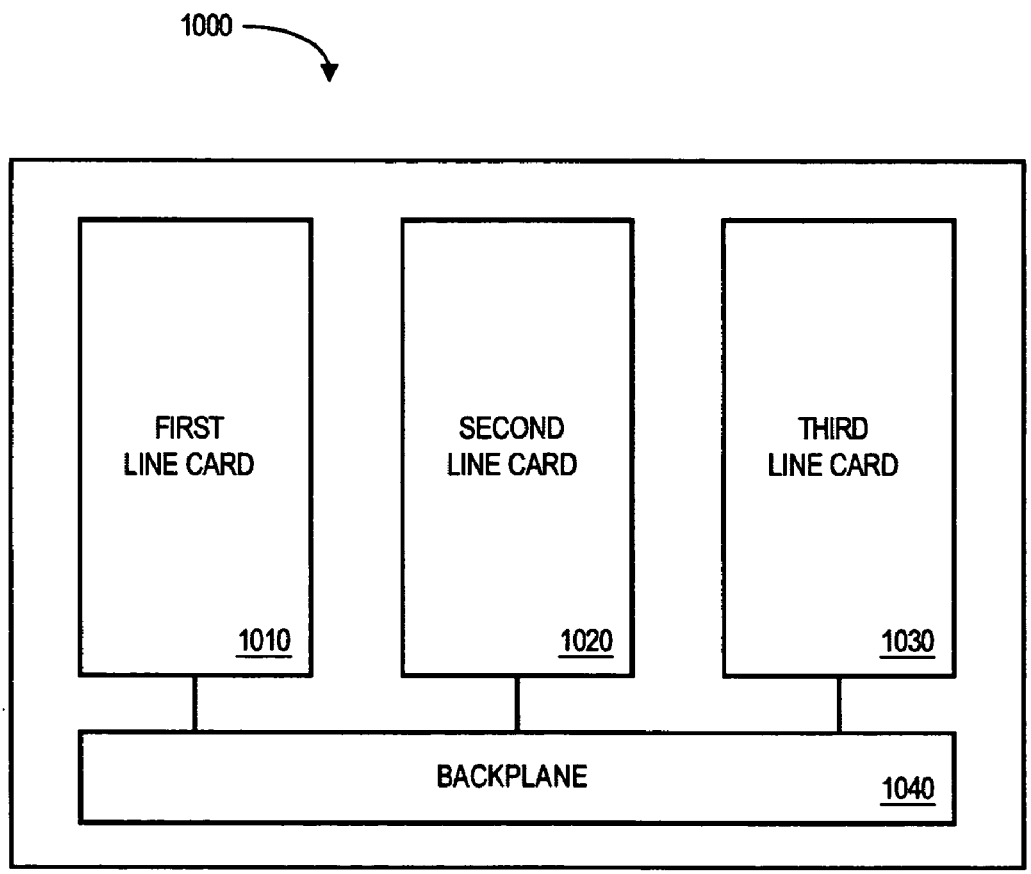
FIG. 10 is an example of a system according to some embodiments.

FIG. 10 is an example of a system 1000 according to some embodiments. The system 1000 may comprise, for example, a media gateway, a carrier-class voice over packet gateway, or any other type of network device. The system 1000 includes a number of line cards 1010, 1020, 1030 that exchange information via a backplane 1040. The line cards may, for example, exchange information through one or more networks (e.g., via T1, E1, and/or J1 interfaces). The backplane may, for example, include a PCI and/or a Time-Division Multiplexing (TDM) bus.

According to some embodiments, an article, comprises: a storage medium having stored thereon instructions that when executed by a machine result in the following: receiving at a processing element a request to transmit a packet associated with a packet identifier; determining a number of transmit buffers to be associated with the packet; and arranging for the packet to be transmitted through a port without storing the packet identifier in a local transmit queue if the number of transmit buffers does not exceed a pre-determined threshold.

According to some embodiments, an article comprises: a storage medium having stored thereon instructions that when executed by a machine result in the following: receiving at first thread in a first processing element a request to transmit a packet; determining a size of the packet; and arranging for the first thread to provide requests to transmit multiple sub-packets if the size of the packet does not exceed a pre-determined threshold, wherein the requests are provided to a second processing element.

According to some embodiments, an article comprises: a storage medium having stored thereon instructions that when executed by a machine result in the following: receiving at a second processing element requests to transmit multiple sub-packets, the requests being received from a first thread executing at a first processing element; and arranging for the sub-packets to be transmitted through a port using a transmit buffer for each sub-packet.

The several embodiments described herein are solely for the purpose of illustration. Persons skilled in the art will recognize from this description other embodiments may be practiced with modifications and alterations limited only by the claims.

What is claimed is:

1. A method, comprising:

receiving at a processing element a request to transmit a packet associated with a packet identifier;

determining a number of transmit buffers to be associated with the packet;

arranging for the packet to be transmitted through a port without storing the packet identifier in a local transmit queue if the number of transmit buffers does not exceed a pre-determined threshold; and evaluating a status of the port associated with the packet, wherein it is arranged for the packet to be transmitted without storing the packet identifier in the local transmit queue only if (i) the number of transmit buffers does not exceed the pre-determined threshold and (ii) the port is available to transmit the packet.

2. The method of claim 1, further comprising:
arranging for the packet identifier to be stored in the local transmit queue for that port if the number of transmit buffers exceeds the pre-determined threshold.

3. The method of claim 2, wherein the packet identifier is stored in an external memory unit when the local transmit queue for that port is full.

4. The method of claim 1, wherein the evaluation is based on a flow-control condition of that port.

5. The method of claim 1, further comprising:
determining if the local transmit queue is empty, wherein it is arranged for the packet to be transmitted without storing the packet identifier in the local transmit queue only if (i) the number of transmit buffers does not exceed the pre-determined threshold and (ii) the local transmit queue is empty.

6. The method of claim 1, wherein the request to transmit the packet is received from a queue manager.

7. The method of claim 1, wherein said receiving, determining, and arranging are executed by a processing thread in a multi-threaded, reduced instruction set computer microengine.

8. The method of claim 7, wherein the microengine is associated with at least one of: (i) a network device, (ii) a network processor, and (iii) an asynchronous transfer mode network device.

9. The method of claim 1 further comprising storing the packet in the number of transmit buffers.

10. An article, comprising:
a storage medium having stored thereon instructions that when executed by a machine result in the following:
receiving at a processing element a request to transmit a packet associated with a packet identifier;
determining a number of transmit buffers to be associated with the packet;
arranging for the packet to be transmitted through a port without storing the packet identifier in a local transmit queue if the number of transmit buffers does not exceed a pre-determined threshold;
evaluating a status of the port associated with the packet, wherein it is arranged for the packet to be transmitted without storing the packet identifier in the local transmit queue only if (i) the number of transmit buffers does not exceed the pre-determined threshold and (ii) the port is available to transmit the packet.

11. The article of claim 10, wherein execution of the instructions further results in:
arranging for the packet identifier to be stored in the local transmit queue for that port if the number of transmit buffers exceeds the pre-determined threshold.

12. An apparatus, comprising:
an input path to receive a request to transmit a packet associated with a packet identifier;
a local memory portion; and
a processing portion that arranges for the packet to be transmitted through a port without storing the packet identifier in the local memory portion if a number of transmit buffers to be associated with the packet does not exceed a pre-determined threshold;
wherein the processing portion arranges for the packet to be transmitted through the port without storing the packet identifier in the local memory portion only if (i) the number of transmit buffers does not exceed the pre-determined threshold and (ii) the port is available to transmit the packet.

13. The apparatus of claim 12, wherein the processing portion stores the packet identifier in the local memory portion if the number of transmit buffers exceeds the pre-determined threshold.

14. A system, comprising:
a backplane;
a first line card connected to the backplane; and
a second line card connected to the backplane, the second line card including a processing element having:
an input path to receive a request to transmit a packet associated with a packet identifier,
a local memory portion, and
a processing portion that arranges for the packet to be transmitted through a port without storing the packet identifier in the local memory portion if a number of transmit buffers to be associated with the packet does not exceed a pre-determined threshold;
wherein the processing portion arranges for the packet to be transmitted through the port without storing the packet identifier in the local memory portion only if (i) the number of transmit buffers does not exceed the pre-determined threshold and (ii) the port is available to transmit the packet.

15. The system of claim 14, wherein the processing portion stores the packet identifier in the local memory portion if the number of transmit buffers exceeds the pre-determined threshold.

16. A method, comprising:
receiving at a processing element a request to transmit a packet associated with a packet identifier;
determining a number of transmit buffers to be associated with the packet;
arranging for the packet to be transmitted through a port without storing the packet identifier in a local transmit queue if the number of transmit buffers does not exceed a pre-determined threshold; and
determining if the local transmit queue is empty, wherein it is arranged for the packet to be transmitted without storing the packet identifier in the local transmit queue only if (i) the number of transmit buffers does not exceed the pre-determined threshold and (ii) the local transmit queue is empty.

* * * * *